United States Patent
Bloom

(10) Patent No.: US 7,095,913 B2
(45) Date of Patent: Aug. 22, 2006

(54) NON-ACTIVE WAVEGUIDES ON PLANAR LIGHTWAVE CIRCUITS

(75) Inventor: Robin S. Bloom, Petaluma, CA (US)

(73) Assignee: Avago Technologies Fiber IP (Singapore) Pte. Ltd., Singapore (SG)

(*) Notice: Subject to any disclaimer, the term of this patent is extended or adjusted under 35 U.S.C. 154(b) by 265 days.

(21) Appl. No.: 10/406,512

(22) Filed: Apr. 2, 2003

(65) Prior Publication Data
US 2004/0197044 A1    Oct. 7, 2004

(51) Int. Cl.
G02B 6/12    (2006.01)
G02B 6/26    (2006.01)
G02B 6/10    (2006.01)

(52) U.S. Cl. .............................. 385/14; 385/16; 385/24; 385/129

(58) Field of Classification Search ................... 385/14, 385/15, 16–23, 24, 31, 39, 50, 147, 129
See application file for complete search history.

(56) References Cited

U.S. PATENT DOCUMENTS

| | | | |
|---|---|---|---|
| 5,014,096 A * | 5/1991 | Matsuda et al. | ............... 257/83 |
| 5,699,462 A | 12/1997 | Fouquet et al. | |
| 5,841,919 A | 11/1998 | Akiba et al. | |
| 5,960,131 A * | 9/1999 | Fouquet et al. | ............... 385/17 |
| 6,195,478 B1 | 2/2001 | Fouquet | |
| 6,654,390 B1 * | 11/2003 | Spiegelberg et al. | ........... 372/6 |
| 2003/0123778 A1 * | 7/2003 | DePue et al. | .................. 385/14 |

OTHER PUBLICATIONS

S. Venkatesh et al., "Performance Improvements in Buble-Actuated Photonic Cross-Connect Switches", LEOS 2002 Annual Meeting, 1, (2002), (Invited) Paper ME1, pp. 39-40.
Shalini Venkatesh et al., "Insertion Loss Reduction by Optimization of Waveguide Perturbations", OFC 2002 Postdeadline Papers, FA4-1-FA4-3.
U.S. Appl. No. 10/027,498, filed Dec. 21, 2002, (31 pages).

* cited by examiner

Primary Examiner—Akm Enayet Ullah

(57) ABSTRACT

A planar lightwave circuit includes a first active waveguide, a second active waveguide, and a non-active waveguide interposed between the first and the second active waveguides. The circuit further includes a third active waveguide that intersects (1) the first active waveguides at a first cross point, and (2) the second active waveguide at a second cross point. A first active perturbation is located at the first cross point, and a second active perturbation is located at the second cross point. A passive perturbation is located at one of the first, the second, and the third active waveguide.

6 Claims, 4 Drawing Sheets

NON-ACTIVE WAVEGUIDES ON PLANAR LIGHTWAVE CIRCUITS

FIELD OF INVENTION

This invention relates to planar lightwave circuits (PLCs), more specifically to a PLC with reduced crosstalk in adjacent active waveguides.

DESCRIPTION OF RELATED ART

Optical circuits such as PLCs are used in a variety of applications. One application is in the area of communication systems. In these systems, a switching device receives a plurality of optical signals from input terminals. Then, these signals are selected, redirected, and transmitted to output terminals. Often, the redirection is performed using an array of switches in a matrix layout.

In fully optical switching devices, optical signals are carried along a waveguide. Perturbations are formed within or along the waveguide to perform switching or other operations on the optical signal traveling in the waveguide. Typically, the waveguides are laid out as a grid having intersections, or cross points, and the perturbations are formed at the intersections thereby creating a matrix of perturbations. For instance, a perturbation can be a liquid filled trench used as an optical switch, a doped portion of the waveguide, or other structure or material having a refractive index different than the refractive index of the waveguide. The refractive index of the switching perturbation is capable of being changed between a number of possible states, for instance between two levels. One of the two levels causes light to pass through the perturbation without changing direction, and the other causes the light to change direction and pass into the crossing waveguide. In the case of a liquid filled trench, the liquid may be moved aside to leave a gaseous phase at the crosspoint, or a bubble may be created within it. In either case, the trench defines a three-dimensional index of refraction distribution, positioned at a cross point of two waveguides, and changing its value performs the switching operation.

SUMMARY

In one embodiment of the invention, a planar lightwave circuit includes a first active waveguide, a second active waveguide, and a non-active waveguide interposed between the first and the second active waveguides. The circuit further includes a third active waveguide that intersects (1) the first active waveguides at a first cross point, and (2) the second active waveguide at a second cross point. A first active perturbation is located at the first cross point, and a second active perturbation is located at the second cross point. A passive perturbation is located at one of the first, the second, and the third active waveguides.

DETAILED DESCRIPTION

Optical signal loss occurs at each stage of the transmission. This is called insertion loss. The insertion loss of a component or an optical path is normally defined as the difference between the power entering and leaving the component or optical path. The insertion loss limits the distance over which the signal can travel. In a device, such as an optical switch, the insertion loss limits the number of switches that can be effectively used to control or operate on input signals. Accordingly, there is a need for methods and apparatus to reduce and minimize the insertion losses in an optical switch and other optical components.

Figure 1:
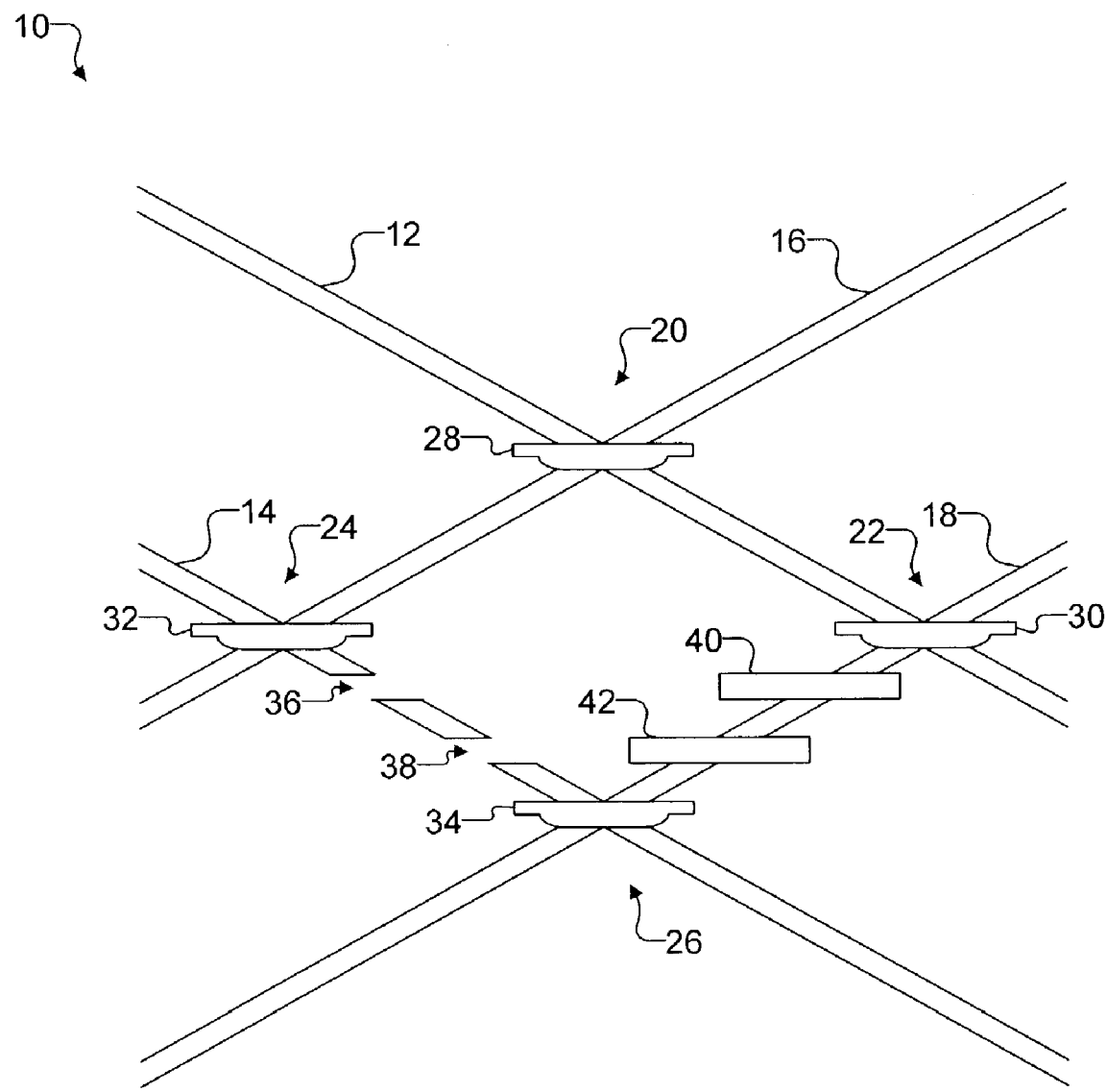
FIGS. 1 and 1A illustrate top views of a planar lightwave circuit (PLC).

FIG. 1 illustrates a top view of a planar lightwave circuit (PLC) 10 in one embodiment of the invention. PLC 10 includes a first group of waveguides 12 and 14 arranged generally along a first direction, and a second group of waveguides 16 and 18 arranged generally along a second direction. Waveguides 12, 14, 16, and 18 are cores sandwiched between an upper cladding and a lower cladding (e.g., a substrate). The core and the cladding materials have different refractive indices so that optical signals are guided along the cores.

Waveguides 12 and 14 intersect waveguides 16 and 18 at four cross points. Specifically, waveguide 12 intersects waveguides 16 and 18 at cross points 20 and 22, respectively, and waveguide 14 intersects waveguides 16 and 18 at cross points 24 and 26, respectively. Each waveguide is divided into waveguide segments at the cross points.

Active perturbations 28, 30, 32, and 34 are formed at cross points 20, 22, 24, and 26, respectively. Each active perturbation is an optical switch that controls the path of an optical signal. The optical switch can be a trench filled with an index matching medium that allows light traveling in the waveguide to pass directly through. The index matching medium can be a liquid having a refractive index same as or similar to the refractive index of the waveguide segments. When devoid of the index matching medium, such as when the trench is filled with a bubble generated by a heating element, the incident light is reflected into an adjoining waveguide. For example, optical switch 32 can be operated so a light signal in waveguide 14 is reflected to waveguide 16 or allowed to pass through, and optical switch 34 can be operated so the light signal in waveguide 14 is reflected to waveguide 18 or allowed to pass through.

While illustrated as a matrix of two by two waveguides for a total of four optical switch points, PLC 10 may include any number of waveguides, having a commensurate number of cross point switches at the intersections thereof. For example, PLC 10 may be a 32 by 32 optical switch having 32 input waveguides, 32 output waveguides, and 1024 cross point switches.

PLC 10 further includes passive perturbations 36, 38, 40, and 42 for reducing insertion loss through waveguides 14 and 18. Specifically, passive perturbations 36 and 38 are formed along waveguide 14 between active perturbations 32 and 34, and passive perturbations 40 and 42 are formed along waveguide 18 between active perturbations 30 and 34. While only four passive perturbations are shown, PLC 10 may include any number of passive perturbations along any number of waveguides.

The passive perturbations increase the number of perturbations that an optical signal encounters within PLC 10. Intuitively, this should increase the insertion loss of PLC 10. However, experimental results have shown that by decreasing the spacing of the perturbations, both active and passive, the passive perturbations reduce the insertion loss through PLC 10. For example, see (1) Shalini Venkatesh, Marshall DePue, Hiroaki Okano and Hisato Uetsuka, "Insertion loss reduction by optimization of waveguide perturbations," OFC 2002 Postdeadline Papers, FA4-1–FA4-3; (2) S. Venkatesh, J. E. Fouquet, R. Haven, M DePue, D. Seekola, H. Okano and H. Uetsuka, "Performance improvements in bubble-actuated photonic cross-connect switches," LEOS 2002 Annual Meeting, 1, (2002), (Invited) Paper ME1, pp 39–40; and (3) U.S. patent application Ser. No. 10/027,498, entitled "A Method and Apparatus for Reducing Optical Insertion Loss in Planar Lightwave Circuits Through Dielectric Perturbation Optimization," filed Dec. 21, 2002.

Each passive perturbation has a three dimensional refractive index distribution that is different than that of each waveguide. Further, each passive perturbation refractive index can be same or different than the refractive index of the active perturbations.

In one embodiment, passive perturbations are core breaks in a waveguide filled with cladding material. They are illustrated as core breaks 36 and 38 in waveguide 14. In another embodiment, passive perturbations are non-active trenches in a waveguide that does not perform any switching function. They are illustrated as non-active trenches 40 and 42 in waveguide 18.

In other embodiments, a passive perturbation can also be a region of varying refractive index, geometric variation of characteristic waveguide dimensions, index profile, a region of doping concentration different from that in each waveguide, a modification of the topography of the array of waveguides, or any combination of these.

Typically, adjacent waveguides along the same general direction are spaced apart about 260 microns. Accordingly, the active perturbations are also spaced apart about 260 microns. In some embodiments, depending on the dimensions and the core and cladding index values, placing passive perturbations between active perturbations, thus reducing the overall spacing, can be advantageous in terms of reducing insertion loss. In one embodiment, the spacing of all the perturbations, both active and passive, is reduced to less than 110 microns (e.g., 90 microns) when passive perturbations are placed between the active perturbations. These passive perturbations may be equally spaced apart between the active perturbations.

Figure 1A:
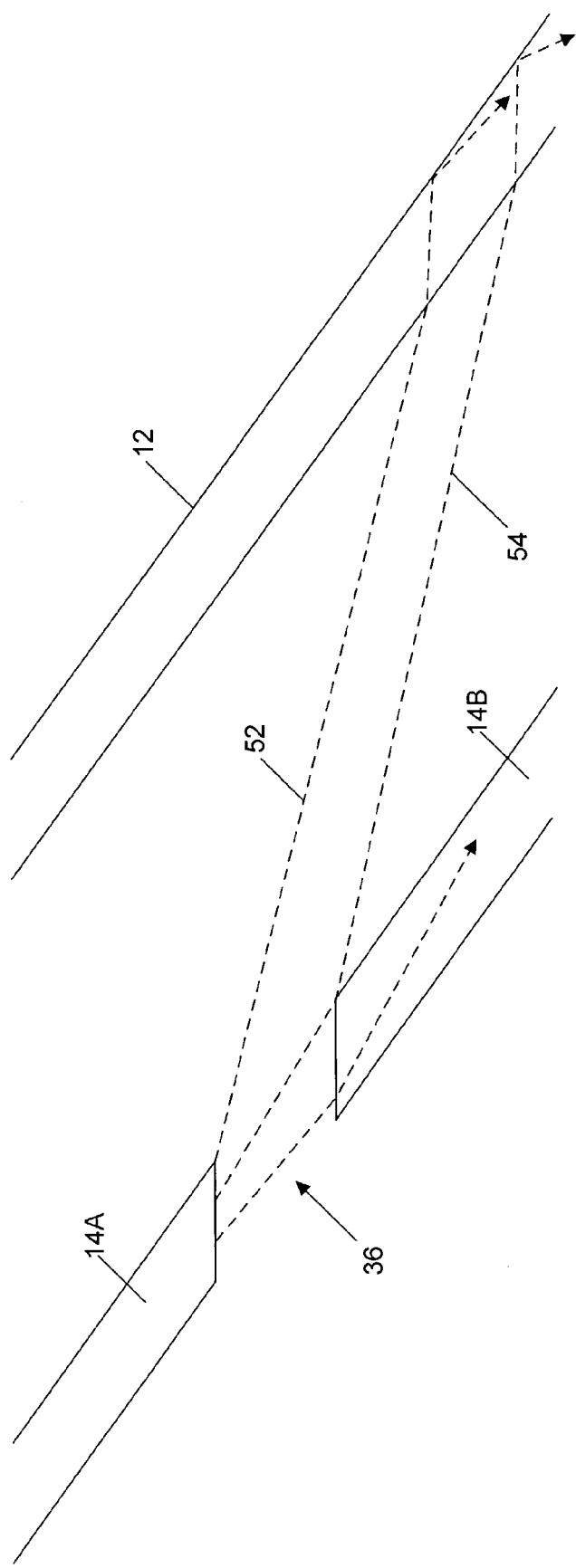

A disadvantage of adding passive perturbations to reduce insertion loss is the crosstalk received by one or more adjacent waveguides from stray light refracted at the passive perturbations. For example, FIG. 1A shows that a light ray 52 may refract as it crosses the interface between a first segment 14A of waveguide 14 and passive perturbation 36. Similar, a light ray 54 may refract as it crosses the interface between passive perturbation 36 and a second segment 14B of waveguide 14. At certain angles, refracted light rays 52 and 54 can enter adjacent waveguide 12 and cause an unacceptable level of crosstalk between active waveguides 12 and 14. Accordingly, there is a need for methods and apparatus to reduce and minimize the crosstalk between waveguides having passive perturbations.

Figure 2:
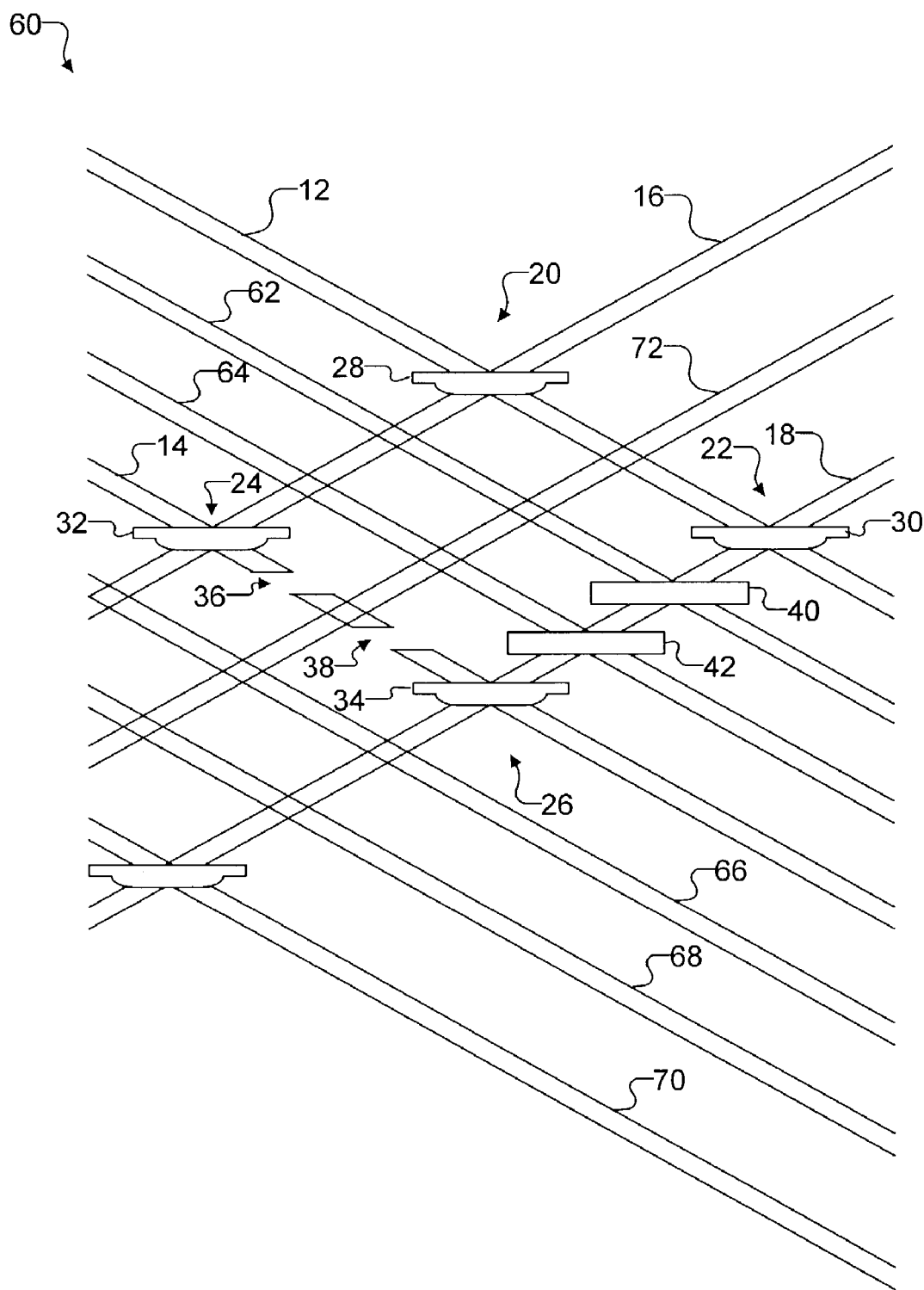
FIGS. 2 and 2A illustrate top views of a PLC in one embodiment of the invention.

FIG. 2 illustrates a top view of a PLC 60 in one embodiment of the invention. Same or similar elements in FIGS. 1 and 2 are identified by the same reference number.

Additional waveguides 62 and 64 are placed between waveguides 12 and 14. Waveguides 62 and 64 are non-active waveguides that do not carry optical signals. In other words, non-active waveguides are not coupled to any input or output terminals of PLC 60 to receive or transmit any input or output signals. In contrast, waveguides 12, 14, 16, and 18 are active waveguides that can carry optical signals.

Figure 2A:
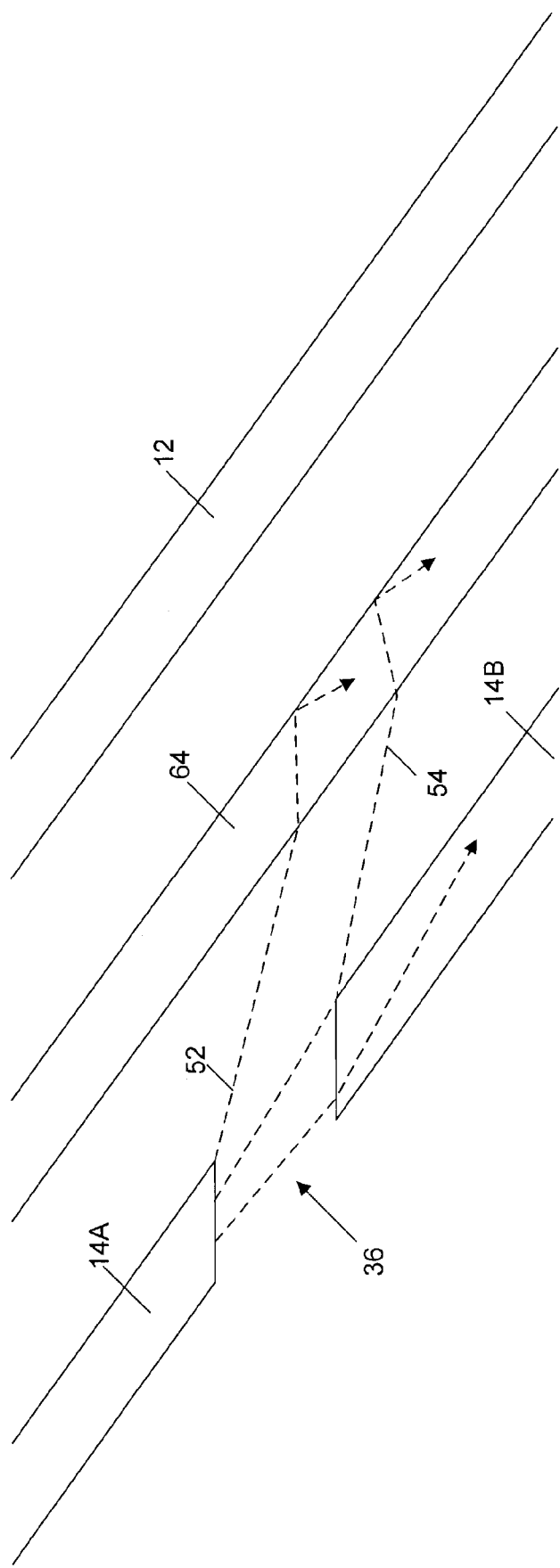

Non-active waveguides 62 and 64 capture the refracted light caused by the passive perturbations (e.g., passive perturbations 36, 38, 40, and 42). For example, FIG. 2A shows that light rays 52 and 54 refract from active waveguide 14 at passive perturbation 36, and enter into non-active waveguide 62. Once light rays 52 and 54 enter non-active waveguide 62, they can only travel down non-active waveguide 62. For clarity, non-active waveguide 64 is omitted from FIG. 2A. Thus, waveguides 62 and 64 reduce crosstalk between active waveguides 12 and 14 stemming from the passive perturbations.

Non-active waveguides 66 and 68 are also placed between active waveguide 14 and an adjacent active waveguide 70 to reduce any crosstalk stemming from the passive perturbations. Similarly, a non-active waveguide 72 is placed between active waveguides 16 and 18 to reduce crosstalk stemming from the passive perturbations. While only one or two non-active waveguides between active waveguides are shown, PLC 60 may include any number of non-active waveguides between active waveguides.

In one embodiment, non-active waveguides are of the same dimensions as active waveguides. Thus, the same processing steps used to form active waveguides can be used to form non-active waveguides.

In another embodiment, non-active waveguides are made larger than active waveguides in order to capture more refracted light. Using larger non-active waveguides can also reduce the number of smaller non-active waveguides needed to reduce the crosstalk stemming from the passive perturbations.

While non-active waveguides can be used to capture stray light caused by passive perturbations, non-active waveguides can also be placed between active waveguides without passive perturbations to reduce crosstalk caused by other sources, including stray light caused by imperfection on the surface of the active waveguides.

Various other adaptations and combinations of features of the embodiments disclosed are within the scope of the invention. Numerous embodiments are encompassed by the following claims.

What is claimed is:

1. A planar lightwave circuit, comprising:
   a first active waveguide;
   a second active waveguide;
   a non-active waveguide interposed between the first and the second active waveguides;
   a third active waveguide, the third active waveguide intersecting the first active waveguide at a first cross point, the third active waveguide intersecting the second active waveguide at a second cross point;
   a first active perturbation at the first cross point;
   a second active perturbation at the second cross point; and
   a passive perturbation in one of the first, the second, and the third active waveguides.

2. The circuit of claim 1, wherein the non-active waveguide and the first, the second, and the third active waveguides have the same dimensions.

3. The circuit of claim 2, wherein the first active perturbation comprises a liquid filled trench and a heating element.

4. The circuit of claim 3, wherein the passive perturbation comprises one selected from the group consisting of a non-active trench, a break in a waveguide, and a doped portion of a waveguide.

5. A method for operating a planar lightwave circuit, comprising:
   operating a first optical switch to direct an optical signal between a first active waveguide and a second active waveguide;
   operating a second optical switch to direct the optical signal between the first active waveguide and a third active waveguide;

passing the optical signal through a passive perturbation along the first waveguide and between the first and the second optical switches to reduce insertion loss; and absorbing a stray portion of the optical signal caused by the passive perturbation with a non-active waveguide adjacent to and interposed in parallel between the second and the third active waveguides, wherein the non-active waveguide does not carry any light signals.

6. A method for operating a planar lightwave circuit, comprising:

operating a first optical switch to direct an optical signal between a first active waveguide and a second active waveguide, wherein said operating a first optical switch is selected from the group consisting of (1) allowing the optical signal to pass from the first active waveguide to the second waveguide and (2) allowing the optical signal to continue in the first active waveguide past the second waveguide;

operating a second optical switch to direct the optical signal between the first active waveguide and a third active waveguide, wherein said operating a second optical switch is selected from the group consisting of (1) allowing the optical signal to pass from the first active waveguide to the third waveguide and (2) allowing the optical signal to continue in the first active waveguide past the third waveguide;

passing the optical signal through a passive perturbation along the first waveguide and between the first and the second optical switches to reduce insertion loss; and absorbing a stray portion of the optical signal caused by the passive perturbation with a non-active waveguide interposed between the second and the third active waveguides.

* * * * *